(12) United States Patent
Jean et al.

(10) Patent No.: US 10,277,685 B2
(45) Date of Patent: Apr. 30, 2019

(54) METHOD FOR AUTOMATICALLY INTERFACING A COMMUNICATION TERMINAL WITH OBJECTS

(71) Applicant: Alcatel Lucent, Boulogne Billancourt (FR)

(72) Inventors: Jose Jean, Nozay (FR); Alain Pastor, Nozay (FR)

(73) Assignee: Alcatel Lucent, Nozay (FR)

( * ) Notice: Subject to any disclaimer, the term of this patent is extended or adjusted under 35 U.S.C. 154(b) by 660 days.

(21) Appl. No.: 14/408,704

(22) PCT Filed: Jun. 12, 2013

(86) PCT No.: PCT/EP2013/062135
§ 371 (c)(1),
(2) Date: Dec. 17, 2014

(87) PCT Pub. No.: WO2013/189804
PCT Pub. Date: Dec. 27, 2013

(65) Prior Publication Data
US 2015/0172392 A1 Jun. 18, 2015

(30) Foreign Application Priority Data
Jun. 19, 2012 (EP) .................................. 12172607

(51) Int. Cl.
*G06F 15/16* (2006.01)
*H04L 29/08* (2006.01)
(Continued)

(52) U.S. Cl.
CPC ................ *H04L 67/16* (2013.01); *G06F 8/60* (2013.01); *G06F 8/62* (2013.01); *H04L 67/12* (2013.01); *H04L 67/34* (2013.01)

(58) Field of Classification Search
CPC ......... H04L 67/12; H04L 67/16; H04L 67/34; G06F 8/60; G06F 8/62
(Continued)

(56) References Cited

U.S. PATENT DOCUMENTS 6,040,661 A * 3/2000 Bogdan ................ H05B 41/295
315/224
6,418,554 B1 * 7/2002 Delo ........................ G06F 8/61
717/174
(Continued)

FOREIGN PATENT DOCUMENTS

JP 2003-078971 A 3/2003
WO WO 2007/148899 A1 12/2007

OTHER PUBLICATIONS

International Search Report for PCT/EP2013/062135 dated Jul. 23, 2013.
(Continued)

*Primary Examiner* — Imad Hussain
(74) *Attorney, Agent, or Firm* — Fay Sharpe LLP

(57) ABSTRACT

A method for interfacing a communication terminal (1) connected to a communication network (2) with object devices (4), comprising the steps of: —determining required services of an application executable from the communication terminal, —determining services provided by a plurality of objects devices connected to the communication network (2), —comparing the required services to the provided services so as to determine a missing service required by the application, —determining an upgradable object device among the plurality of object devices for a missing service, the upgradable object device belonging to an object type having a hardware capability (6) associated to said missing service, —searching a software resource repository (10) for a software module adapted so as to be downloaded to the upgradable object device to enable the upgradable object (Continued)

device to provide the missing service, —triggering a transfer of the software module from the software resource database to the upgradable object device.

19 Claims, 3 Drawing Sheets

(51) Int. Cl.
  *G06F 8/60* (2018.01)
  *G06F 8/61* (2018.01)
(58) Field of Classification Search
  USPC .......................................................... 709/217
  See application file for complete search history.

(56) References Cited

U.S. PATENT DOCUMENTS

| | | | | |
|---|---|---|---|---|
| 6,711,737 B1* | 3/2004 | Okamura | ............ | G06F 9/44521 717/168 |
| 7,127,526 B1* | 10/2006 | Duncan | ............ | G06F 15/16 709/249 |
| 7,954,098 B1* | 5/2011 | Martin | ............ | G06F 8/61 717/176 |
| 8,001,542 B2* | 8/2011 | Edwards | ............ | G06F 8/61 717/171 |
| 8,145,798 B1 | 3/2012 | Buck et al. | | |
| 8,154,741 B2* | 4/2012 | Furst | ............ | G06Q 10/0875 358/1.15 |
| 8,274,680 B2* | 9/2012 | Hamatani | ............ | G06F 9/445 358/1.1 |
| 8,392,877 B1* | 3/2013 | Chiluvuri | ............ | G06F 8/36 717/106 |
| 8,527,943 B1* | 9/2013 | Chiluvuri | ............ | G06F 8/36 717/106 |
| 8,578,329 B1* | 11/2013 | Chiluvuri | ............ | G06F 8/36 717/106 |
| 9,058,177 B2* | 6/2015 | Chiluvuri | ............ | G06F 8/36 |
| 9,279,595 B2* | 3/2016 | Mighdoll | ............ | G05D 23/1902 |
| 9,385,921 B1* | 7/2016 | Jarrett | ............ | H04L 41/12 |
| 9,661,103 B2* | 5/2017 | Luna | ............ | H04W 74/06 |
| 2001/0002914 A1* | 6/2001 | Aramoto | ............ | G06F 8/65 370/535 |
| 2001/0034771 A1* | 10/2001 | Hutsch | ............ | G06F 9/541 709/217 |
| 2001/0051929 A1* | 12/2001 | Suzuki | ............ | G06Q 30/02 705/52 |
| 2002/0020444 A1* | 2/2002 | Dickerson, Jr. | ............ | F17C 13/045 137/112 |
| 2003/0233631 A1* | 12/2003 | Curry | ............ | G06F 8/20 717/100 |
| 2004/0016243 A1* | 1/2004 | Song | ............ | F25D 29/00 62/132 |
| 2004/0122989 A1* | 6/2004 | Hall | ............ | G06F 9/445 710/8 |
| 2005/0132354 A1* | 6/2005 | Edwards | ............ | G06F 8/61 717/174 |
| 2006/0117105 A1* | 6/2006 | Lesenne | ............ | G06F 9/44526 709/226 |
| 2007/0011272 A1* | 1/2007 | Bakke | ............ | G06F 9/5027 709/217 |
| 2007/0106772 A1* | 5/2007 | Johnson | ............ | G06F 9/445 709/223 |
| 2007/0169090 A1* | 7/2007 | Kang | ............ | G06F 8/65 717/168 |
| 2007/0201654 A1* | 8/2007 | Shenfield | ............ | G06F 9/44521 379/201.01 |
| 2007/0201655 A1* | 8/2007 | Shenfield | ............ | G06F 8/61 379/201.01 |
| 2008/0045172 A1* | 2/2008 | Narayanaswami | .... | G06Q 30/02 455/187.1 |
| 2008/0086370 A1* | 4/2008 | Narayanaswami | ... | G06F 3/1415 705/14.73 |
| 2008/0115189 A1* | 5/2008 | Lejeune | ............ | H04N 7/163 725/141 |
| 2008/0216100 A1* | 9/2008 | Li | ............ | H04N 5/4401 719/330 |
| 2008/0282243 A1* | 11/2008 | Seguin | ............ | G06F 9/45533 718/1 |
| 2009/0042549 A1* | 2/2009 | Lee | ............ | G06F 17/30905 455/414.4 |
| 2009/0066486 A1* | 3/2009 | Kiekbusch | ............ | G08B 5/221 340/286.02 |
| 2009/0144837 A1* | 6/2009 | Huff | ............ | G06F 11/3668 726/30 |
| 2010/0050179 A1* | 2/2010 | Mohindra | ............ | G06F 9/5044 718/104 |
| 2010/0056268 A1* | 3/2010 | Langan | ............ | A63F 13/12 463/29 |
| 2010/0161778 A1* | 6/2010 | Guinard | ............ | G06F 9/5044 709/222 |
| 2010/0283573 A1* | 11/2010 | Yum | ............ | F25D 29/00 340/3.1 |
| 2011/0022626 A1* | 1/2011 | Plache | ............ | G05B 19/0426 707/769 |
| 2011/0051165 A1* | 3/2011 | Yamada | ............ | G06F 3/1203 358/1.13 |
| 2011/0115979 A1* | 5/2011 | Aoki | ............ | H04N 7/16 348/602 |
| 2011/0161478 A1 | 6/2011 | Formo et al. | | |
| 2011/0211583 A1* | 9/2011 | Seetharaman | ............ | H04L 45/00 370/400 |
| 2011/0213843 A1* | 9/2011 | Ferrazzini | ............ | H04L 63/102 709/206 |
| 2012/0019674 A1* | 1/2012 | Ohnishi | ............ | G08C 17/00 348/207.1 |
| 2012/0040738 A1* | 2/2012 | Lanning | ............ | G07F 17/3202 463/20 |
| 2012/0066671 A1* | 3/2012 | Adhikary | ............ | G06F 8/35 717/170 |
| 2012/0131095 A1* | 5/2012 | Luna | ............ | H04L 67/04 709/203 |
| 2012/0131184 A1* | 5/2012 | Luna | ............ | H04W 28/14 709/224 |
| 2012/0192249 A1* | 7/2012 | Raleigh | ............ | G06Q 10/06375 726/2 |
| 2012/0254431 A1* | 10/2012 | Kylau | ............ | G06F 9/54 709/226 |
| 2012/0324079 A1* | 12/2012 | Quinet | ............ | H04L 67/16 709/223 |
| 2013/0055232 A1* | 2/2013 | Rajan | ............ | G06F 8/658 717/170 |
| 2013/0074061 A1* | 3/2013 | Averbuch | ............ | G06F 8/665 717/171 |
| 2013/0111499 A1* | 5/2013 | Dixon | ............ | G06F 13/00 719/314 |
| 2013/0124715 A1* | 5/2013 | Averbuch | ............ | H04L 67/34 709/224 |
| 2013/0138783 A1* | 5/2013 | Mallur | ............ | G06F 8/65 709/221 |
| 2013/0247117 A1* | 9/2013 | Yamada | ............ | G08C 17/02 725/93 |
| 2013/0310726 A1* | 11/2013 | Miller | ............ | A61M 1/288 604/5.04 |
| 2013/0325939 A1* | 12/2013 | Shim | ............ | G06Q 50/10 709/203 |
| 2014/0002479 A1* | 1/2014 | Muijs | ............ | G06T 5/50 345/589 |
| 2014/0038693 A1* | 2/2014 | Lanning | ............ | G07F 17/3202 463/20 |
| 2014/0304699 A1* | 10/2014 | He | ............ | H04W 8/245 717/171 |
| 2015/0081906 A1* | 3/2015 | Backholm | ............ | H04W 74/06 709/225 |
| 2016/0029402 A1* | 1/2016 | Backholm | ............ | H04W 76/10 370/329 |
| 2017/0126840 A1* | 5/2017 | Luna | ............ | H04W 74/06 |
| 2017/0142744 A9* | 5/2017 | Luna | ............ | H04W 74/06 |
| 2018/0091506 A1* | 3/2018 | Chow | ............ | H04L 67/2838 |

(56) References Cited

U.S. PATENT DOCUMENTS

OTHER PUBLICATIONS

Guinard, D., et al., "Towards the Web of Things: Web Mashup for Embedded Devices", Proc. 2nd Workshop on Mashups, Enterprises Mashups and Lightweight Composition on the Web (MEM'09), 2009.

* cited by examiner

METHOD FOR AUTOMATICALLY INTERFACING A COMMUNICATION TERMINAL WITH OBJECTS

FIELD OF THE INVENTION

The invention relates to the field of the interaction between a communication terminal and physical objects through a communication network.

BACKGROUND

The invention notably relates to the internet of objects and more precisely to the so-called "Web Of Things" which consists in transforming the physical objects in resources available through the web. The physical object may communicate through the Web. For instance, communication terminals, televisions, advertising boards, lamps, household appliances can communicate through the internet.

One application of this architecture is, for a user, to interact through a communication terminal and through the internet with the physical objects. Such a terminal may be a personal computer, a notebook, a cellphone such as a "Smartphone".

Such mechanisms are notably described in works concerning the "Web of Things". See for instance, the paper "Towards the Web of Things: Web Mashup for Embedded Devices" by D. Guinard and V. Trifa in Proc. 2nd Workshop on Mashups, Enterprises Mashups and Lightweight Composition on the Web (MEM'09), 2009.

Those works aim at allowing the consideration of physical objects as available resources for applications in order to enlarge the interaction possibilities between a user and physical objects through his communication terminal.

SUMMARY

In an embodiment, the invention provides a method for interfacing a communication terminal connected to a communication network with object devices, comprising the steps of:
   determining required services of an application executable from the communication terminal,
   determining services provided by a plurality of objects devices connected to the communication network,
   comparing the required services to the provided services so as to determine a missing service required by the application,
   determining an upgradable object device among the plurality of object devices for a missing service, the upgradable object device belonging to an object type having a hardware capability associated to said missing service,
   searching a software resource repository for a software module adapted so as to be downloaded to the upgradable object device to enable the upgradable object device to provide the missing service,
   triggering a transfer of the software module from the software resource database to the upgradable object device.

According to embodiments, such device can comprise one or more of the features below.

In embodiments of the method, the required services are determined on the basis of a description of the application including identifications of the services required by the application.

In embodiments of the method, the method further comprises an initial step of generating the description of the application and the associated identifications of the services required by the application as a function of a user's selection of a service and/or a predefined application.

In embodiments of the method, the generation of a description comprises a step of accessing a services database and/or predefined applications database, the selection of a service and/or an predefined application being made on the basis of the services and/or predefined applications included in the services and/or predefined applications database.

In embodiments of the method, the generation of the description comprises a step of generating a logic description in the application description as a function of a logic determined by the user which describes the relations between services and/or predefined applications for the execution of the application.

In embodiments of the method, the step of generating a description of the application comprises a step of identifying a service required by the predefined application as a function of the interface point of the internal application.

In embodiments of the method, a software module is associated to the application in the initial step of generating description of the application and stored on the communication terminal, the searching of the software module being made in the communication terminal.

In embodiments of the method, the step of determining the required services further comprises a step of accessing an object description comprising indications on the services provided by the object, the determination of the provided services being made on the basis of the indications on the provided services of the object description.

In embodiments of the method, the determination of an upgradable object comprises:
   a step of accessing an object description of a plurality of object device, the object description comprising an indication on the type of a respective object,
   a step of identifying a type of object device needed as a function of the missing service and
   a step of selecting an object device as a function of the type of object needed and the indications on the type of object, the triggering of the transfer being made to the selected object device.

In embodiments of the method, the method further comprises:
   a step of determining a second set of object devices after the first set of object devices,
   a step of determining an outdated object device as an object device which is comprised in the first set of object devices but absent in the second set of object devices, and
   a step of triggering the uninstalling of the software module from the outdated object device.

In embodiments of the method, the software module search step is made in a software resource repository which is external to the communication terminal and connected to the communication network.

In embodiments of the method, the search step is made in a software resource repository which is integrated to the communication terminal and the software module is associated to the application.

In embodiments of the method, the method further comprises a step of determining a set of object devices connected to the communication network as a function of the communication terminal localization and wherein the determination of the services provided by a plurality of objects devices is made on said set of object devices.

In an embodiment, the invention also provides a computer program comprising computer-executable instructions that perform the above-mentioned method when executed.

The invention originates from the observation that the objects cannot easily change or evolve to integrate new services, especially as a function of the user e.g. at the user's initiative. For instance, when an application cannot match the services it requires with the objects in its environment, it cannot apply its logic to the objects and therefore cannot fulfill its tasks. Therefore, when the objects present in the user's environment change, for instance when the user is moving from a place to another place, the continuity of the service may not be provided for the application as some of the services may become unavailable.

Therefore, an idea on which the invention is based is to provide a method which consists in detecting in the objects of the users environment the missing services which are needed to launch an application, and automatically update the objects so as the previously missing services become available in order to insure the operability of the application. Therefore, the method allows to dynamically deal with changes in the user's environment by providing missing required services to the objects so as to make an application operational.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
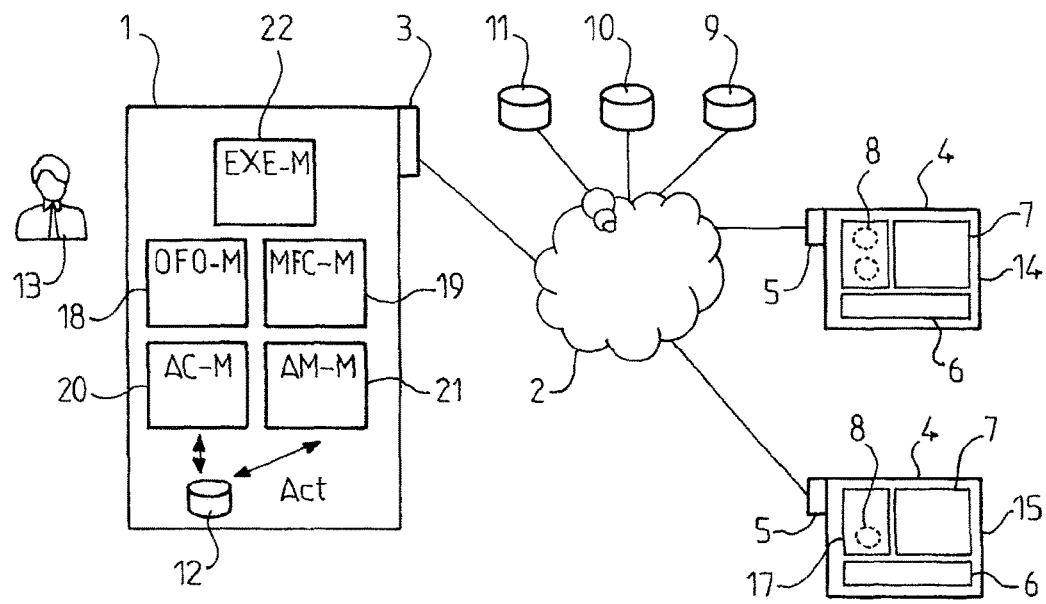
FIG. 1 is a schematic representation of a general architecture of a system in which an embodiment of the invention may be implemented.

FIG. 1 illustrates a communication terminal 1 controlled by a user 13 and connected to a network 2. More precisely, the communication terminal 1 comprises a communication interface 3 which allows it to communicate with the network 2. The communication terminal 1 may be a mobile terminal such as a mobile phone i.e. a smartphone or a notebook, and the communication interface 3 may then be a radio interface, i.e. Wifi, 3G, LTE, etc.

A plurality of physical objects 4, especially a television 14 and a lamp 15, are connected to the communication network 2. For that purpose, the physical objects 4 also comprise communication interfaces 5 connected to the network 2 through an interface device which is built directly in the physical objects 4. Alternatively, an interface device may form a gateway between a plurality of physical objects 4 and the communication network 2.

The physical objects 4 may be of different nature. For instance, the physical objects 4 may be devices such as advertisement boards, televisions, lamps, household appliances, communication terminals, fridges, cameras, media drives, information displays etc. These physical objects 4 may be present in the user's home but also in public environments or other locations, for instance the user's workplace.

The communication network 2 is generally a composite network that may comprise different kinds of networks e.g. a private wired network, a public network, a radio network etc.

The physical objects 4 offer a plurality of services 8 via their network interface 5. A service 8 is a function offered by a physical object 4 which is available through the "web of things" and therefore may be used or activated through the user's terminal 1 or by another physical object 4. For instance, the Television 14 may offer several services 8 comprising changing of the channel, changing the luminance, changing the volume, displaying a picture or a videostream, etc. With this panel of services it is possible to remotely control the Television.

Similarly, the lamp 15 provides services. For instance, the lamp provides a switch-on/switch-off service. Furthermore, the lamp 15 comprises hardware 6 able to change the light and the color of the lamp 15. The switch-on/switch-off service is enabled by the capability of the lamp 15 to change the light. More precisely, a switch-on/switch-off module 17 enables turning the lamp 15 on or off based on instructions emitted by the user's terminal 1. However, even if the lamp 15 already integrates a switch-on/switch-off module providing a switch-on/switch-off service, the lamp 15 may further evolve to propose new services.

For that purpose, each physical object comprises an extension module 7. This extension module 7 comprises an information storage in which a software module may be stored. When stored on a physical object, a software module allows the physical object 4 to provide a new service. The new service is accessible to the user's terminal 1 through the interfacing between the user's terminal 1 and an interface point of the software module.

For instance, the software module may be a software module allowing the interaction between an external object, such as the user terminal 1, with the hardware 6 of a respective physical object 4. For that purpose, on a first end the software module comprises an interface points which allows receiving and/or emitting a datastream from or to an interface point of the user's terminal 1, or from or to an interface point of another physical object 4. On the other end the software module provides commands and/or receives data from the hardware 6 of the physical object 4.

A specific example of a new service that may be implemented in the lamp 15 is a blink service. This blink service makes the lamp 15 blink at a specific sequence of "on" and "off". Therefore, a software module may be installed on the information storage of the lamp 15, and provide the blink service on demand. This service allows the lamp to provide new capabilities or functionalities associated to its hardware. However, another kind of service may also be data stored in the object 6.

The communication terminal 1 comprises a user interface which allows the user to execute and/or create applications stored in a storage device of the communication terminal 1.

Each application needs one or more service 8 provided by the physical objects 4 to fulfill its tasks. Therefore, when the application is executed or active, the user's terminal 1 communicates with the physical objects 4 and employs the offered services notably through the software modules of the physical objects 4. For instance, when executed, a "turn on the lamp" application requires the use of the switch-on/switch-off module of the lamp.

However, the services required by the application may not be initially available on the physical objects 4 present in the user's environment.

Indeed, the required services may not have been expected in the manufacturing phase of the physical object 4. Therefore, in order to interface the application with the surrounding physical objects 4 so as to be able to execute said application, the communication terminal 1 is able to initiate the implementation of an additional software module in one of the appropriate physical object 4 in which the required service is lacking.

As a specific example, the user's terminal comprises an "ambilight" application. When executed in an environment with the lamp 15 and the television 14, the ambilight application makes the lamp 15 communicating with the television 14, in a transparent way, for calculating the dominant color of the picture of the television 15 when the user watch a movie on this television 15. The lamp 15 changes then the color of the user environment according to the dominant color.

However, the above mentioned lamp 15 does not initially offer a service that provides a functionality of changing the light color as a function of the screen dominant color, as well as a functionality that provides a physical object to physical object communication which will initiate the communication the dominant color from the television 14 to the lamp 15.

Therefore, the communication terminal 1 automatically implements a software module in the lamp 15 which will enable to provide this ambilight service to the ambilight application. More precisely the software module will communicate with the television 14 in order to receive a datastream comprising the dominant color. With the dominant color, the software module will give instructions to the hardware 6 to change the color of the lamp 15 accordingly.

This implementation may be made at the moment of the execution of the application. Alternatively, the implementation may be achieved as a background protocol which continuously upgrades the physical object 4 so as to enable the execution of the application in the user's terminal 1 in its environment.

The automatic implementation of the required services in the physical objects 4 enables a continuity of the operation of an active application when the user's environment changes.

In order to manage and create applications, the communication terminal 1 comprises an Activity Creation Module 20 (AC-M) and an Activity Management Module 21 (AM-M).

The Activity Creation Module 20 allows the user to create extended applications, also called oriented activities that will use one or more object's services and may also use applications when executed. The creation of such an extended application allows the user to organize several applications and services in one same extended application. This extended application may be executed as a background application on an extended period of time.

More precisely, an extended application is a meta-data package which may contain applications references, a logic description and at least one service extension.

The logic description specifies the logical relations between the applications and the services extensions in the extended application.

A service extension makes references to a service to be used in the surrounding physical objects 4 and may be for instance associated to an application programming interface (API) which corresponds to a software interface which will allow the application to communicate with the physical objects 4 through the interface points.

In other words, the extended application corresponds to a services profile which indicates the necessary services in order to execute the application and comprises a logic that organizes the services and applications. The service extensions are identified by their semantic description.

The user 13 creates the extended application by adding one or several applications and/or one or several services extension.

The service extensions may be found by queering an extension database 10 and the applications may be retrieved in an application database 9 which may be external to the user's terminal 1. When an application is retrieved from the application database 9, services extensions are added to the oriented activity and linked to the application according to the needs of the application i.e. the interface point of the respective application. More precisely, these needs may be indicated by a semantic description of the respective application, and the appropriate service extensions may be identified by the user's terminal from the extension database 10 according to these needs.

During the creation of the oriented activity, the user 13 may orchestrate the execution of the called applications and services by configuring a logical scheme that will organize the services and the application as expected by the user during its execution.

Figure 3:
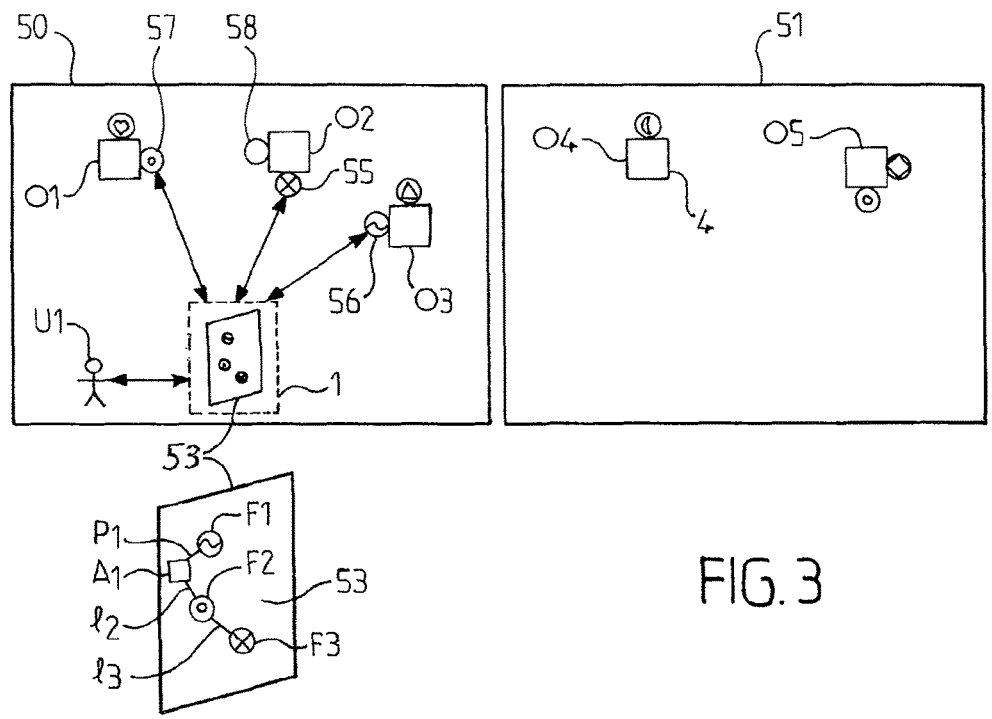

For instance, in FIG. 3, an application 53 comprises three service extensions F1, F2 and F3, and one application A1 which are interrelated by logical relations I1, I2, I3.

The Activity Management Module 21 enables the user 13 to access and execute the extended applications. Therefore, the Activity Management Module 21 allows the user to manually execute an extended application or executes automatically the extended application as a function of the current time. In other words, the extended application may be automatically activated by the communication terminal 1 when the current time is in a specified timeslot predefined by the user through the Activity management module 21. Moreover, several extended application may be active at a same time.

The Activity Management Module 21 retrieves the extended applications which are for instance created by the user in an internal database 12 of the communication terminal 1 or accesses it by querying a remote database 11. In the case of a remote database 11, when the application is selected, the application is downloaded and stored on the communication terminal 1.

In order to control the execution of the extended applications, the communication terminal 1 further comprises an execution module 22 (EXE-M) which ensures the execution and the organization of the applications and the services according to the services extensions and of the extended application and according to the respective control logic of the extended applications.

For the purpose of upgrading the appropriate physical objects 4 of the user environment so as to enable the execution of the extended applications, the communication terminal 1 comprises a object overview module 18 (OFO-M), and a missing services collector module 19 (MFC-M).

The object overview module 18 analyses the environment of the user 13 in order to list a set of available physical objects 4 in this environment and determine the services offered by these physical objects 4.

An external database may reference the available physical objects 4. This database can associate the objects 4 and their geographical position. For instance, the database can contain data associating the identifier of the physical objects 4 with their characteristics, state, hardware capabilities, provided services, type of object and geographical position. These data are stored as a description associated to each physical object 4. The description is for instance in XML language and may also be called a semantic description. Notably, the geographical position may be latitude and longitude coordinates. The set of physical objects 4 may be determined dynamically by the localization of the communication terminal 1. In other words, the computing means in the terminal 1 may continuously refresh, through a background protocol the set of physical objects 4 as a function of the localization of the communication terminal 1.

The object overview module 18 determines the missing services in the set of physical objects 4 according to a list of offered services in the environment determined by the Object overview module 18.

The missing services collector module 19 then implements software modules enabling the provision of the required services on the appropriate physical objects 4. The software modules are provided from the service extension database 10 or from a local database.

Figure 2:
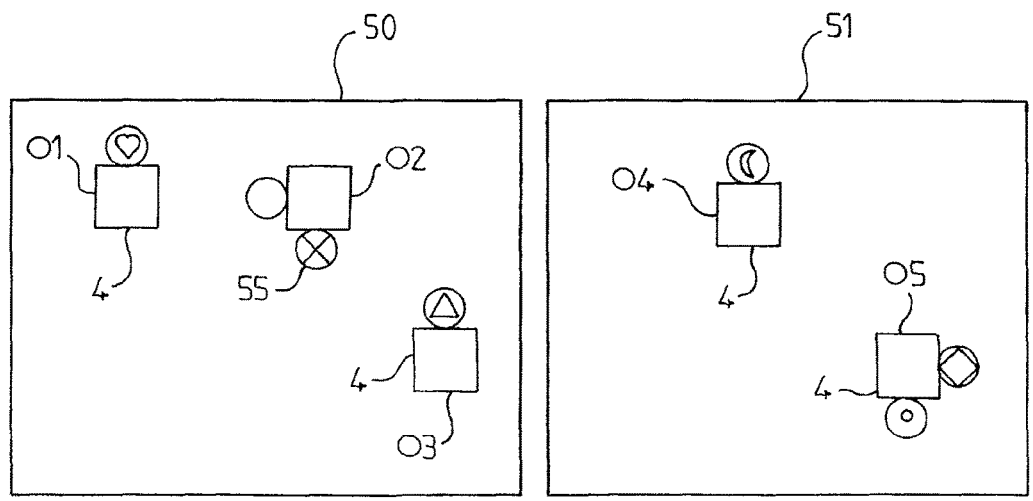
FIGS. 2 to 4 are schematic representations of successive points in time each time in two distinctive places when a method according to an embodiment of the invention is employed on a communication terminal.
Figure 4:
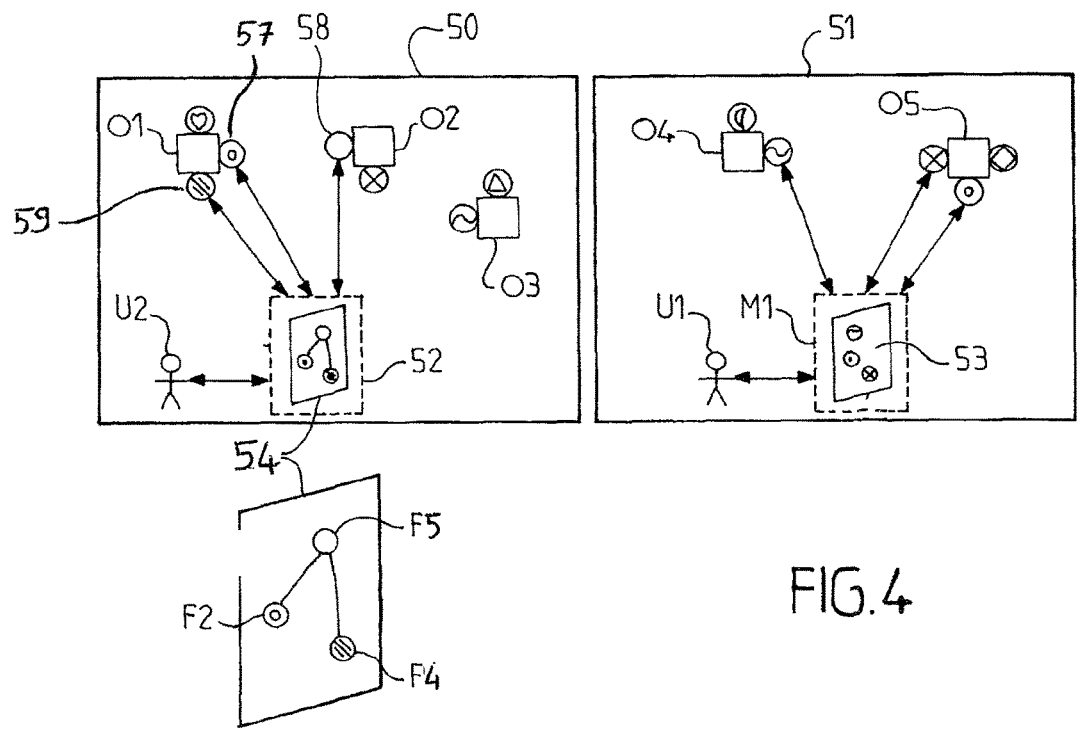

FIGS. 2 to 4 illustrate the state of the physical objects 4 and communication terminals 1 and 52 in several successive moments in two separate places. During these successive moments, the operation's continuity of extended applications 53 and 54 is enabled by the automatic implementation of software modules.

FIG. 2 corresponds to an initial state in the two different places. Each place corresponds to a logical identification of a set of neighboring physical objects 4:

A first place 50 corresponding to the user's living room comprises three different physical objects 4: a video camera O1, a Television O2 and a Hi-Fi system O3.

A second place 51 corresponding to the user's kitchen comprises two different physical objects 4: a baby phone O4 and a screen on a fridge O5.

In this initial state a set of services are already available from the several physical objects 4 present in the two places and are illustrated by the schematized circles. For instance, the television O2 offers two different services schematized by two different patterns, the X pattern corresponding to a ShowVideoStream services 55.

In FIG. 3, a user U1 arrives at the first place 50 and activates a video call application 53, which is an extended application, by means of the communication terminal 1. The video call application 53 makes a video call using the surrounding physical objects 4 with an automatic capture of the minutes, and the displaying of the videocall on a screen as a function of the behavior of the user 13. Especially, when the user looks into the direction of the television O2, the video call is displayed on the television O2. This application 52 contains three services extensions F1, F2, F3 that indicate the services to be provided by the surrounding physical objects 4 that will affect their behavior or state.

More precisely, F1 corresponds to a speechToText function that requires the provision of the minutes as a function of the soundtrack. F2 corresponds to a "presence sensor" function and may be fulfilled by an eyeTracking service allowing a physical object recording a video to monitor the attention of the user and the direction of his field of view. F3 indicates a function requiring the video call to be broadcasted to a screen of a physical object 4.

The service extensions F1, F2 and F3 are preferably associated in the extended application semantic description to semantic values. The object overview module 18 of the user's terminal 1 analyses the surrounding physical objects 4 in order to determine if the objects provide services matching the service extensions of the application or equivalents services by comparing the semantic values of the service extensions and the services provided by the surrounding objects.

An association of a service extension and a provided service can be made when the corresponding semantic value of the provided services and required services present an important semantic correlation.

The semantic values may be the identifier of the service or complementary keywords. Therefore, the correlation may be made directly on the identifier of the service or complementary keywords associated to the service. Similarly, the correlation can be based on the identifier of the service extension or on keywords associated to the service extension. For instance, the association can be made if the service extension and the provided services present an identical Keyword or identifier.

However, other methods may be employed and can take into account the fact that a semantic value may be more generalized than another. For instance the service may have a "display picture" semantic value and the application may have a "display photograph" semantic description. Such correlations may be then detected by the user's terminal 1 which then associates of the application with the respective physical object 4. A correlation may also be detected by the user's terminal when two semantic values are synonyms.

It may also be required to make a finer correlation. For that purpose, the computation means of the communication terminal 1 may use an ontology. This ontology may be accessible on the web, or can be local. The ontology may evolve to integrate new services, new evolutions and new devices. The use of an ontology allows to correlate similar concepts: for instance "scintillate" may be correlated with "blink".

Turning back to the example, only the television O2 provides one of the required services, which is the ShowVideoStream service 55. As two services are missing in the environment corresponding to the first place 50, the missing services 56 and 57 are retrieved from a database, in order to guarantee the execution of the application. Alternatively, the software modules are directly packaged into the activity as a software package.

The appropriate software modules corresponding to missing services 56 and 57 are installed onto the appropriated physical objects 4 by the missing services collector module 19 so as to offer the required services: speechToText service 56 is installed onto the Hifi System O3 and an EyeTracking service 57 is installed onto the video camera O1.

The execution module 22 then executes the video call application 53 according its control logic.

In FIG. 4, the user U1 has moved to the second place 51 while its video call application 53 is still active. The user's environment and more precisely the surrounding objects have completely changed.

Therefore, the object overview module 18 and the missing services collector module 19 fulfill the automatic update of the surrounding objects O4 and O5. The object overview module 18 identifies that the service extension F2 is already available by object O5.

The missing services collector module 19 installs the missing services F1 and F3 onto the two objects O4 and O5. The application can therefore continue its tasks and therefore the continuity of the application is insured.

Meanwhile, a second user U2 arrived at the first place 50 and uses a application 54 that comprises the service extensions F2, F4 and F5. The service extension F2 requires the service 57, the service extension F4 requires the service 59 and the service extension F5 requires the service 58. Therefore, the object overview module 18 identifies that the service required by service extensions F5 and F2 are already available on the objects O1 and O2. However, the service required by the service extension F4 is absent from the surrounding physical object O1, O2 and O3. The missing services collector module 19 installs the missing service 59 onto the object O1. Therefore, the application 54 takes advantage of the previously installed software modules gained through the video call application 53 of the first user U1 as it uses the service 57 added by the communication terminal 1 for the video call application 53.

In embodiments the installed software modules can be automatically uninstalled from an updated object of a place after the user has left the place. For that purpose the communication terminal 1 determines outdated physical objects which are not in his environment anymore and on which a software was installed, and then triggers the uninstall of the software module. Alternatively the physical object 4 may automatically uninstall the software module after a certain time.

Figure 5:
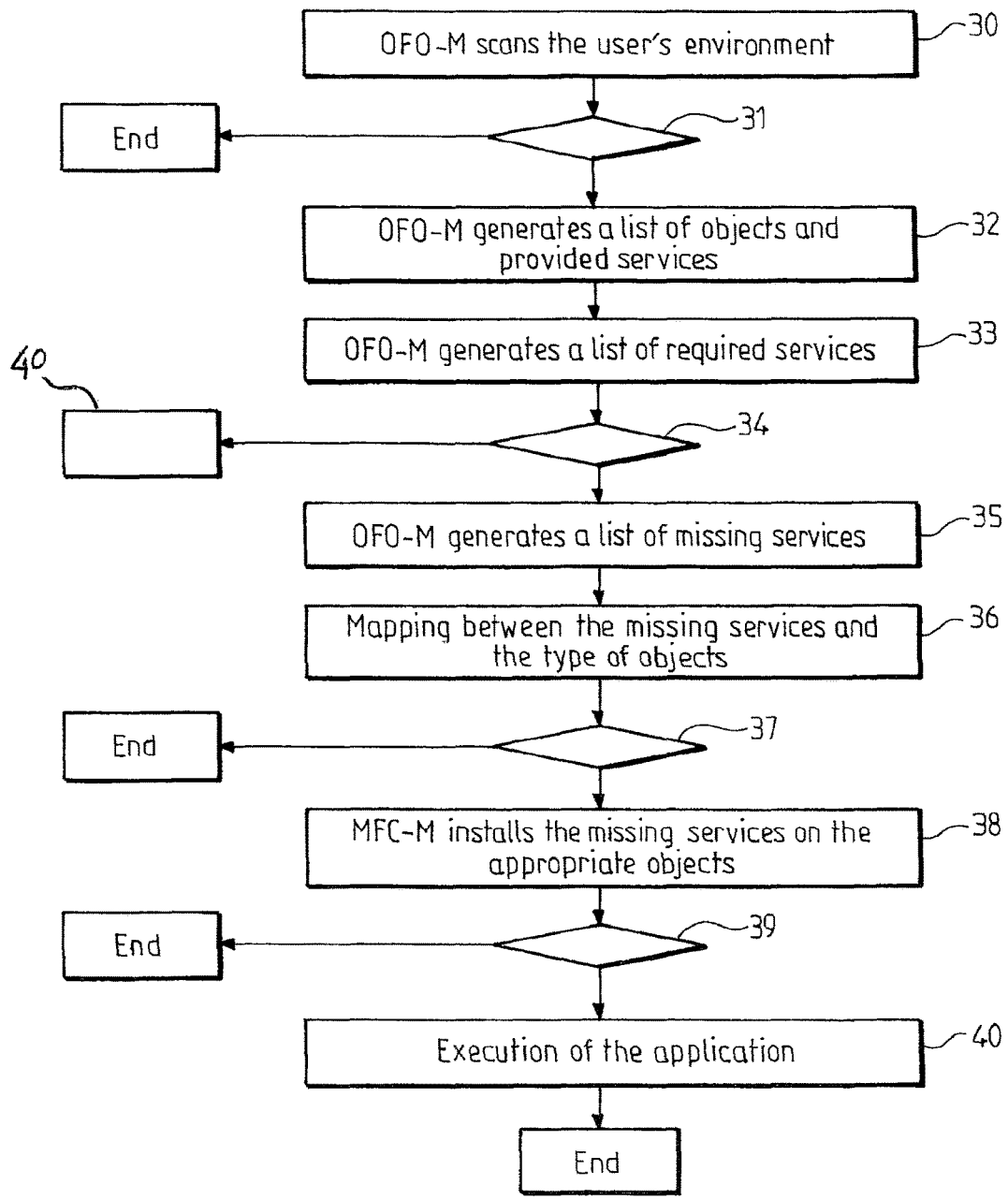
FIG. 5 is a flowchart illustrating the method employed in FIGS. 2 to 4.

A method for upgrading the physical objects according to the needs of the application will now be described with reference to FIG. 5.

In a first step 30, the object overview module 18 analyses the user environment in order to find the objects in the user's environment. In a first test 31, the object overview module 18 verifies if objects are present in the environment. If no object is present the process is stopped.

If objects are detected by the object overview module, the object overview module generates in a resources listing step 32 a set of objects according to the user environment. The object overview module 18 further lists the available services provided by the set of objects. For that purpose, the object overview module 18 analyses the semantic descriptions of the set of objects.

In a required services listing step, the object overview module 18 generates a list of required services according to the application executed by the user. For that purpose, each application is associated to a semantic description which describes notably the services which need to be interfaced with the application. The object overview module 18 compares the semantic descriptions of the provided services and the semantic description of the required services.

If all required services are provided by the objects, the application is launched by the execution module in a step 40, otherwise the object overview module 18 makes a list of the services which do not have a match in the objects of the user environment.

In a further step 36, the object overview module 18 determines the types of objects on which may be implemented the missing features by generating a table associating the missing services with the types of objects that may implement the missing services. For that purpose, the object overview module 18 retrieves missing service requirements for each missing service. The missing service requirement may be retrieved from the extension database 10 or may be directly indicated in the service extension description. The object overview module 18 analyses the semantic description of the physical objects 4 in order to identify the hardware capabilities of the physical objects 4. The hardware capabilities of each object 4 are then compared with the hardware requirements of each of the missing services so as to determine if the physical object 4 belongs to a type compatible with a missing service.

If no matching physical object may be associated to a missing service, the method stops. Else, the test 37 is followed by a step of installing, on the matching physical object, an appropriate software module 38 which is able to use the hardware capabilities so as to provide the missing service.

In other embodiments, the objects overview module may identify the drivers references, or the product and manufacturer identifier of a physical object in the semantic description in order to determine if the physical object and the missing service are compatible. The data about a physical object which is analyzed may be initially stored in the external database referencing the physical objects 4 or in a data storage in said physical object 4 itself.

For that purpose the services collector module 19 retrieves the software module adapted to provide the missing service with the matching object from a software database which may be an external software database on internal to the communication terminal 1. Alternatively packaged software modules which are already associated to the application may be installed. The communication terminal initiates the downloading from the database to the physical object 4 of the software module and its installation on the physical object.

In a further test 39, the services collector module 19 verifies if the software module is successfully installed. If the software module is successfully installed, the application may be launched by the execution module 22 in a next step 40, therefore activating or using the services of the physical objects 4.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several "means".

In the claims, any reference signs placed between parentheses shall not be construed as limiting the scope of the claims.

The invention claimed is:

1. A method for interfacing a communication terminal connected to a communication network with a plurality of physical objects, comprising:
   dynamically determining, in response to a change in a user's environment, required services of an application executable from the communication terminal;
   determining services provided by the plurality of physical objects connected to the communication network;
   comparing the required services to the provided services so as to determine a missing service required by the application;
   determining an upgradable physical object among the plurality of physical objects for a missing service, the upgradable physical object belonging to an object type having a hardware capability associated to said missing service;
   searching a software resource repository for a software module adapted so as to be downloaded to the upgradable physical object to enable the upgradable physical object to provide the missing service;

triggering a transfer of the software module from the software resource repository to the upgradable physical object; and automatically upgrading the hardware capability of the upgradeable physical object via the software module to provide the missing service of the application.

2. A method according to claim 1, wherein the required services are determined on the basis of a description of the application including identifications of the services required by the application.

3. A method according to claim 2, wherein the method further comprises generating the description of the application and the associated identifications of the services required by the application as a function of a user's selection of a service and/or a predefined application.

4. A method according to claim 3, wherein the generation of a description comprises accessing a services database and/or predefined applications database, the selection of a service and/or an predefined application being made on the basis of the services and/or predefined applications included in the services and/or predefined applications database.

5. A method according to claim 3, wherein the generation of the description comprises generating a logic description in the application description as a function of a logic determined by the user which describes the relations between services and/or predefined applications for the execution of the application.

6. A method according to claim 3, wherein the generating a description of the application comprises identifying a service required by the predefined application as a function of the interface point of the internal application.

7. A method according to claim 3, wherein a software module is associated to the application in the generating description of the application and stored on the communication terminal, the searching of the software module being made in the communication terminal.

8. A method according to claim 1, wherein the determining the required services further comprises accessing an object description comprising indications on the services provided by the object, the determination of the provided services being made on the basis of the indications on the provided services of the object description.

9. A method according to claim 1, wherein the determination of an upgradable object comprises:

accessing an object description of a plurality of physical object, the object description comprising an indication on the type of a respective object, identifying a type of physical object needed as a function of the missing service and selecting an physical object as a function of the type of object needed and the indications on the type of object, the triggering of the transfer being made to the selected physical object.

10. A method according to claim 1, wherein the method further comprises:

determining a second set of physical objects after the first set of physical objects, determining an outdated physical object as an physical object which is comprised in the first set of physical objects but absent in the second set of physical objects, and triggering the uninstalling of the software module from the outdated physical object.

11. A method according to claim 1, wherein the software module search is made in a software resource repository which is external to the communication terminal and connected to the communication network.

12. A method according to claim 1, wherein the search is made in a software resource repository which is integrated to the communication terminal and the software module is associated to the application.

13. A method according to claim 1, wherein the method further comprises determining a set of physical objects connected to the communication network as a function of the communication terminal localization and wherein the determination of the services provided by a plurality of physical objects is made on said set of physical objects.

14. The method of claim 1, wherein the upgraded hardware capability comprises a sensor-based light matching function or a switch-based blink function.

15. The method of claim 1, wherein an external database references the plurality of physical objects and associates the physical objects with their characteristics, state, hardware capabilities, provided services, type of object and geographical position.

16. The method of claim 1, further comprising determining outdated physical objects based on location and on which a software was installed and automatically triggering an uninstall of the software module.

17. A non-transitory computer readable medium operable to perform a set of instructions, wherein when said instructions are executed on a computer, cause the computer to perform a method for interfacing a communication terminal connected to a communication network with a plurality of physical objects, the method comprising:

dynamically determining, in response to a change in a user's environment, required services of an application executable from the communication terminal;

determining services provided by the plurality of physical objects connected to the communication network;

comparing the required services to the provided services so as to determine a missing service required by the application;

determining an upgradable physical object among the plurality of physical objects for a missing service, the upgradable physical object belonging to an object type having a hardware capability associated to said missing service;

searching a software resource repository for a software module adapted so as to be downloaded to the upgradable physical object to enable the upgradable physical object to provide the missing service;

triggering a transfer of the software module from the software resource repository to the upgradable physical object; and automatically upgrading the hardware capability of the upgradeable physical object via the software module to provide the missing service of the application.

18. The non-transitory computer readable medium of claim 17, wherein the upgraded hardware capability comprises a sensor-based light matching function or a switch-based blink function.

19. The non-transitory computer readable medium of claim 17, wherein an external database references the plurality of physical objects and associates the physical objects with their characteristics, state, hardware capabilities, provided services, type of object and geographical position.

* * * * *